United States Patent [19]

Wakayama

[11] Patent Number: 5,226,323

[45] Date of Patent: Jul. 13, 1993

[54] METHOD OF AND AN APPARATUS FOR DISPLAYING THE OUTPUT OF AN INTERNAL COMBUSTION ENGINE

[75] Inventor: Atsuo Wakayama, Isesaki, Japan

[73] Assignee: Japan Electronic Control Systems Co., Ltd., Isesaki, Japan

[21] Appl. No.: 740,050

[22] Filed: Aug. 5, 1991

[30] Foreign Application Priority Data

Aug. 9, 1990 [JP] Japan .................................. 2-212578

[51] Int. Cl.$^5$ .......................................... G01M 15/000
[52] U.S. Cl. ...................................... 73/117.3; 73/116
[58] Field of Search ...................... 73/117.3, 116, 23.23

[56] References Cited

U.S. PATENT DOCUMENTS

| | | | |
|---|---|---|---|
| 3,847,019 | 11/1974 | Masaki et al. ...................... | 73/117.3 |
| 4,129,034 | 12/1978 | Niles et al. .......................... | 73/117.3 |
| 4,492,112 | 1/1985 | Igarashi et al. ..................... | 73/117.3 |

FOREIGN PATENT DOCUMENTS 3-42041  4/1991  Japan .

*Primary Examiner*—Hezron E. Williams
*Assistant Examiner*—Nashmiya N. Ashraf
*Attorney, Agent, or Firm*—Foley & Lardner

[57] ABSTRACT

A method of and an apparatus for measuring and displaying the output of an internal combustion engine of a vehicle while the vehicle is moving. An intake air flow quantity Q and a rotation speed N of the engine are calculated to determine an intake air quantity per revolution (Q/N), and provide a base output. At the same time, the method and apparatus detect a fuel flow quantity supplied to the engine, and depending on the fuel flow quantity and intake air flow quantity, calculate an air-fuel ratio by which the base output is corrected to provide an engine output to be displayed.

9 Claims, 4 Drawing Sheets

METHOD OF AND AN APPARATUS FOR DISPLAYING THE OUTPUT OF AN INTERNAL COMBUSTION ENGINE

BACKGROUND OF THE INVENTION (1) Field of the Invention

This invention relates to a method of and an apparatus for displaying the output, i.e., the torque or horsepower of an internal combustion engine while the engine is operating.

(2) Description of the Related Art

The speed, cooling water temperature, etc., of an internal combustion engine for a vehicle are usually displayed on indicators on the dashboard. The output torque of the engine, however, is not usually displayed or used for various control mechanisms such as an automatic transmission of the vehicle. The reason for this is because the torque is barely detectable while the vehicle is running.

To accurately measure the torque of the internal combustion engine of the vehicle, it is necessary to carry out, for example, a bench test using a chassis dynamo. Alternatively, a torque sensor can be used to detect a small torsion on a shaft disposed in a power transmission system.

The former requires large facilities that are naturally not applicable to a vehicle that is moving. The latter is also not practical because the torque sensor is very expensive and not durable.

This applicant has proposed an apparatus for indirectly detecting the torque of an internal combustion engine, according to information in Japanese Unexamined Utility Model Publication No. 3-42041. This apparatus detects, in a vehicle engine, an intake air quantity per revolution (Q/N) according to an intake air flow quantity (Q) and a rotation speed (N) of the engine, multiplies the value (Q/N) by a predetermined constant, subtracts a loss corresponding value from the multiplication result, and then provides the output torque of the engine, when the engine is operating.

This apparatus, however, calculates the output torque and horsepower of the engine only from the intake air flow quantity and rotation speed of the engine with no attention to a change in air-fuel ratio (a mixture ratio) due to a fluctuation in the flow quantity of fuel supplied to the engine. This may cause the displayed torque and horsepower measurements to deviate. The measuring capability of this apparatus, therefore, is not sufficient.

Such deviation particularly occurs in a high-speed heavy-load operation region of the engine. It is necessary to improve the detection accuracy of the apparatus, particulary in this region. The apparatus also makes an erroneous detection when the engine is unsound causing a fluctuation in the fuel flow quantity and air-fuel ratio even when the engine is operating under constant conditions. The apparatus may cause a large measurement error in, for example, a turbo charged vehicle whose air-fuel ratio drastically changes when the accelerator is fully opened.

The displayed torque and horsepower measurements of the apparatus may also deviate from the actual measurements when an ignition timing of the engine fluctuates widely.

SUMMARY OF THE INVENTION

An object of the invention is to provide a method of accurately measuring and displaying the output, i.e., the output torque and output horsepower of an internal combustion engine for a full range of operation of the engine even if an air-fuel ratio is changed due to a fluctuation in a fuel flow quantity, and an apparatus for achieving the method.

Another object of the invention is to provide an engine output display method and apparatus that functions correctly even if an ignition timing fluctuates.

In order to accomplish the objects, a method of displaying the output of an internal combustion engine according to the invention comprises the steps of:
  detecting an intake air flow quantity of the engine;
  detecting a rotation speed of the engine;
  calculating an intake air quantity per revolution according to the intake air flow quantity and rotation speed, and finding a base output;
  detecting a fuel flow quantity supplied to the engine;
  calculating an air-fuel ratio according to the intake air flow quantity and fuel flow quantity;
  correcting the base output with the air-fuel ratio, and calculating an engine output; and
  displaying the engine output.

An apparatus for displaying the output of an internal combustion engine comprises:
  a unit for detecting an intake air flow quantity of the engine;
  a unit for detecting a rotation speed of the engine;
  a unit for calculating an intake air quantity per revolution according to the intake air flow quantity and rotation speed, and finding a base output;
  a unit for detecting a fuel flow quantity supplied to the engine;
  a unit for calculating an air-fuel ratio according to the intake air flow quantity and fuel flow quantity;
  a unit for correcting the base output with the air-fuel ratio, and calculating an engine output; and
  a unit for displaying the engine output.

In this way, the method and apparatus of the invention detect the intake air flow quantity and rotation speed of an engine, and according to these data, calculate an intake air quantity per revolution, i.e., a base output of the engine.

The method and apparatus detect a fuel flow quantity supplied to the engine, and according to the fuel flow quantity and the intake air flow quantity, calculate and air-fuel ratio.

The method and apparatus correct the base output with the air-fuel ratio, calculate a final engine output, and display the final engine output. Even if the air-fuel ratio is changed due to a fluctuation in the fuel flow quantity, the method and apparatus correctly measure and display the engine output for an entire range of operation of the engine.

Further, the apparatus according to the present invention concretely has the constitution so as to display the output, i.e., the output torque and output horsepower of an engine.

The base output calculation means multiplies the intake air quantity per revolution by a predetermined constant, and finds a base torque.

The base output calculation means may provide a base torque correction portion which corrects the base torque by subtracting a loss component depending on the rotation speed of the engine from the base torque.

The engine output calculation means multiplies the base torque calculated by the base output calculation means by a correction coefficient determined by the air-fuel ratio, and calculates the engine output torque. Accordingly, the engine output torque can be measured and displayed. In case the engine output calculation means provides an output horsepower calculation portion which calculates the output horsepower of the engine according to the output torque and the rotation speed of the engine, the output horsepower of the engine can also be measured and displayed.

To cope with a change occurring in an ignition timing, the apparatus is additionally provided with a unit for detecting the ignition timing, and the engine output calculation unit of the apparatus corrects the base output with the air-fuel ratio as well as the ignition timing when calculating the engine output. The correction is made by multiplying the base output by a correction coefficient determined by the ignition timing.

The constitution, function and effect of the present invention will be apparent from the following embodiment.

DESCRIPTION OF THE PREFERRED EMBODIMENTS

Figure 1:
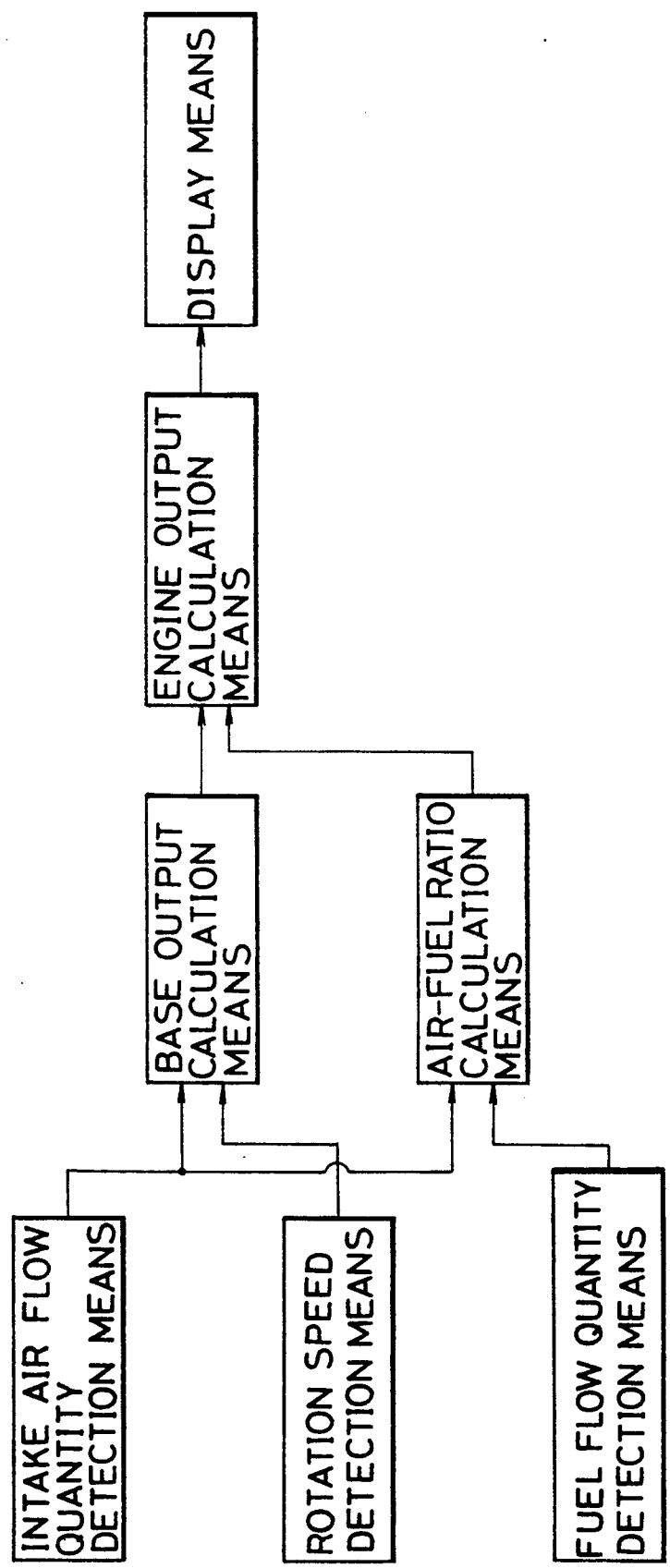
FIG. 1 is a functional block diagram showing an arrangement of the invention.

FIG. 1 shows a basic arrangement of an apparatus for displaying the output of an internal combustion engine according to the invention, and FIGS. 2 to 6 show an embodiment of the apparatus.

Figure 2:
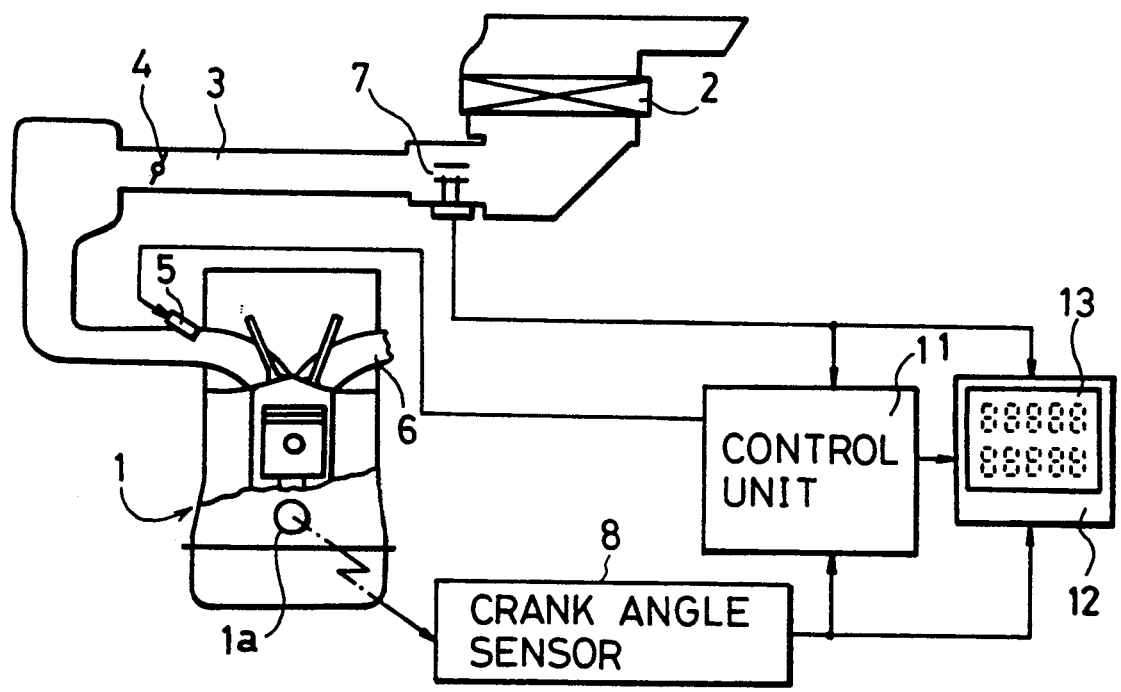
FIG. 2 is a general view showing an apparatus for displaying the output of an internal combustion engine according to an embodiment of the invention.

FIG. 2 shows a general view of the apparatus, in which numeral 1 denotes an internal combustion engine mounted on a vehicle. Intake air passes through an air cleaner 2 and an intake passage 3, and reaches a throttle valve 4, which controls and supplies the air to each cylinder. A fuel injector 5 injects fuel to each cylinder. A mixture of the air and fuel is ignited and exploded with a discharging action of an ignition plug at a predetermined ignition timing, and discharged through an exhaust passage 6. A hot-wire-type airflow meter 7 serving as an intake air flow quantity detection means is arranged in the intake passage 3 to detect an intake air flow quantity Q, which is a weight quantity (kg/h).

A crank angle sensor 8 is arranged at front end of a crank shaft 1a of the engine 1, to detect a crank angle. The sensor 8 provides a reference signal for every predetermined rotation of the engine 1. An engine rotation speed N (rpm) is detectable by measuring the period of the reference signal. The crank angle sensor 8 serves as a rotation speed detection means.

Signals from the airflow meter 7 and crank angle sensor 8 are supplied to control unit 11 and to a measurement unit 12.

The control unit 11 mainly comprises a microcomputer, which works a program for controlling an injection pulse to the fuel injector 5 according to the signals from the airflow meter 7, crank angle sensor 8, etc., to thereby control the injection quantity and injection timing of the fuel injector 5. The control unit 11 also controls an ignition timing by controlling the output timing of an ignition signal. The control unit 11 provides the measurement unit 12 with the width of an injection pulse to the injector 5 or the fuel flow quantity itself as well as the ignition signal or the ignition timing itself.

The measurement unit 12 includes a microcomputer, which measures and displays an engine output according to the signals from the airflow meter 7 and crank angle sensor 8 including information from the control unit 11, to successively calculate an output torque (kg.m) and horsepower (PS) and to display the completed calculation. The measurement unit 12 has a circuit portion and a casing with an indicator 13 to digitally display the completed calculation. The measurement unit 12 with the indicator 13 is fixed to a dashboard of the vehicle.

Figure 3:
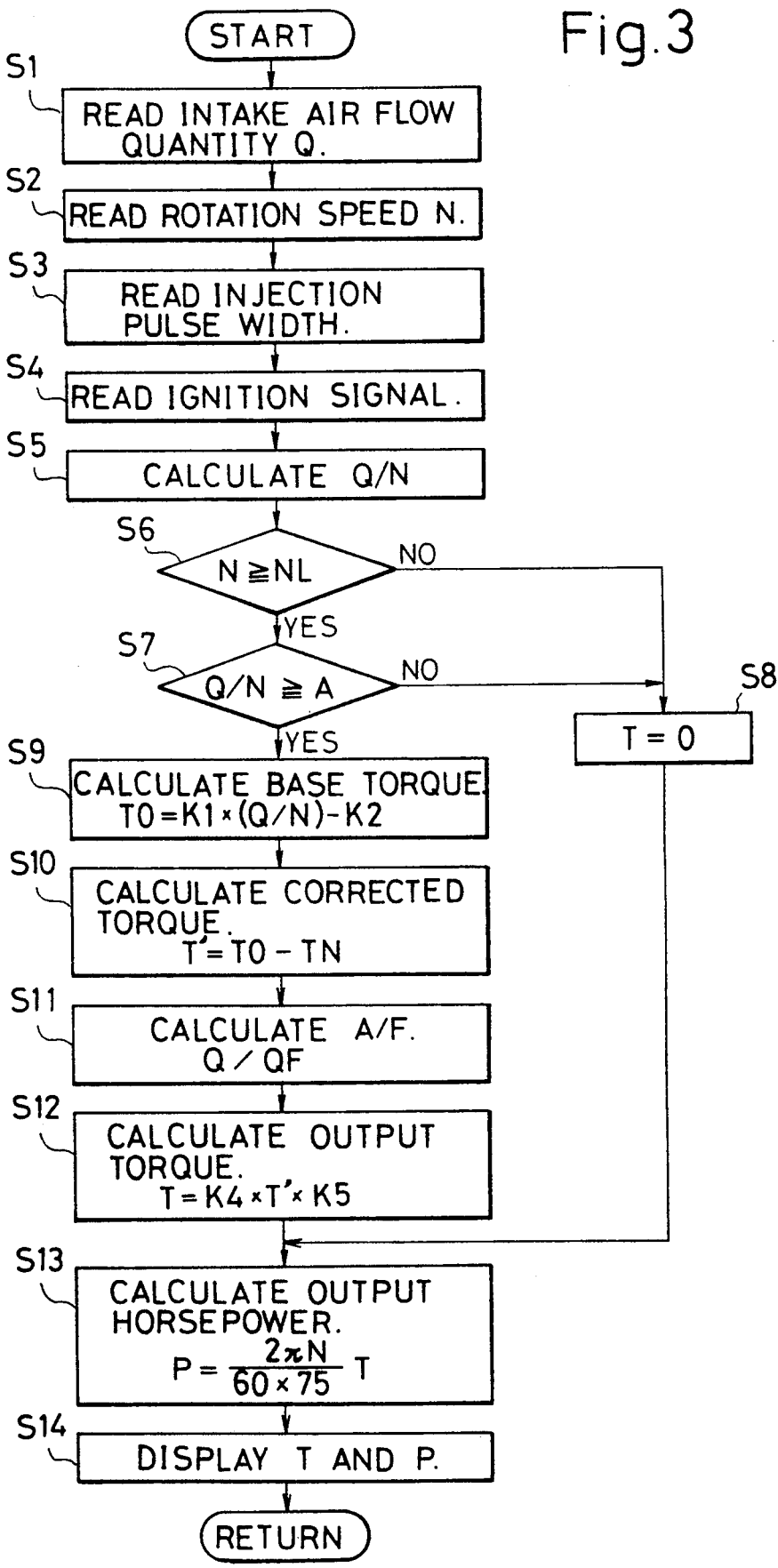
FIG. 3 is a flowchart showing a routine for measuring and displaying an engine output.

FIG. 3 is a flowchart showing the routine of measuring and displaying an engine output. This routine is executed at predetermined intervals (for example, every 2 ms).

Step 1 (S1 in the figure) reads an intake air flow quantity Q (kg/h) based on an output signal of the airflow meter 7. This step and the airflow meter 7 correspond to the intake air flow quantity detection means.

Step 2 reads an engine rotation speed N (rpm) based on an output signal of the crank angle sensor 8. This step and the crank angle sensor 8 correspond to the rotation speed detection means.

Step 3 reads a width Ti of an injection pulse to the fuel injector 5, or a fuel flow quantity QF based on the width Ti, to detect a fuel supply quantity (fuel flow quantity) to the engine 1. This step corresponds to the fuel flow quantity detection means.

Step 4 reads an ignition signal or an ignition timing itself. This step corresponds to an ignition timing detection means.

Step 5 calculates an intake air quantity per revolution Q/N according to the intake air flow quantity Q and rotation speed N. The value Q/N is proportional to the Quantity of air drawn into a cylinder in each cycle, and represents a basic output.

Step 6 determines, according to the rotation speed N, whether or not the engine 1 is actually in operation. Namely, Step 6 compares the rotation speed N with a predetermined rotation speed NL (for example, 500 rpm), and if N<NL, determines that the engine 1 is stopped. Step 8 then zeroes an output torque T, and proceeds to Step 13. If N is equal to or larger than NL, Step 6 determines that the engine 1 is operating, and proceeds to Step 7. This Step 7 determines, according to the intake air quantity per revolution Q/N whether or not the engine 1 is operating with load. Namely if Q/N is smaller than a predetermined value A (for example, 0.01), Step 7 determines that the engine 1 is operating with no load. Step 8 then zeroes the output torque T, and proceeds to Step 13. If Q/N is equal to or larger than the predetermined value A, Step 7 determines that the engine 1 is operating with load, and proceeds to Step 9.

Step 9 calculates a base torque T0 according to the following equation:

$$T0 = K1 \cdot x(Q/N) - K2 \ldots \quad (2)$$

where K1 and K2 are constants determined by the specifications of the engine 1. For example, K1 is about 280 to 350, and K2 about 1 to 4. K2 is a torque used for rotating the engine 1 itself and determined by the displacement of the engine 1.

Step 10 calculates an actual output torque (a corrected torque) T' according to the following equation:

$$T' = T0 - TN \ldots \quad (2)$$

Figure 4:
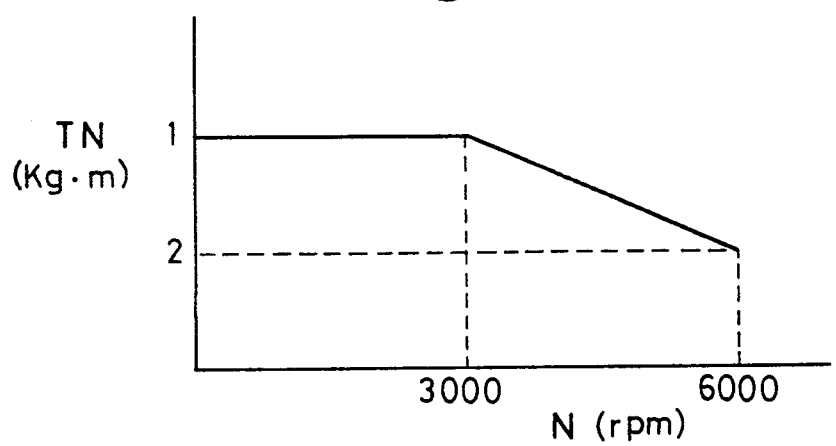
FIG. 4 is a characteristic diagram showing torque losses.

Namely, Step 10 subtracts the torque loss TN determined by the engine rotation speed N from the base torque T0, and finds the actual output torque (corrected torque) T'. The torque loss TN includes a friction loss due to rotation and a loop loss, and is determined according to a characteristic curve such as shown in FIG. 4 with the engine rotation speed N as a parameter.

Steps 5, 9, and 10 correspond to the base output calculation means, in which Step 10 corresponds to a base torque correction portion.

This embodiment separates the loss component into the term K2 that does not depend on the engine rotation speed, and the term TN that depends on the rotation speed, thereby simplifying the process. Instead, the loss component may be collectively handled.

Step 11 calculates an air-fuel ratio(A/F) according to a fuel flow quantity QF obtained from the injection pulse width Ti of the fuel injector 5. This Step 11 corresponds to an air-fuel ratio calculation means.

The fuel flow quantity QF is found according to the following equation:

$$QF = K3 \times qDIN \ldots \quad (3)$$

where the K3 is a proportional constant representing a specific gravity portion obtained by standardizing a unit system. Namely, K3 is obtained by standardizing a relation between kg/h and cc/1000-stroke. In the equation (3), the qDIN is a volumetric flow rate, i.e., a flow rate per pulse. Namely, the qDIN is a dynamic flow rate given by the following equation (in practice, qDIN is calculated from a flow rate per 1000 pulses (cc/1000-stroke):

$$qDIN = (Qstat/60) \times (Ti - 1.5) + q1.5 \ldots \quad (4)$$

where the Ti is an injection pulse (ms) of the fuel injector 5, Qstat a dynamic flow rate (cc/min) of the fuel injector 5 which is stored in a memory (ROM) in advance, and q1.5 is a flow rate at 1.5 ms. The Qstat and q1.5 are preset according to the specifications of the fuel injector 5 and the kind of the engine 1.

The QF of the equation (3) is the fuel injection quantity (fuel flow quantity) of the fuel injector 5.

Thereafter, the air-fuel ratio (A/F), i.e., a ratio of the fuel flow quantity QF to the intake air flow quantity Q is obtained according to the following equation:

$$A/F = Q/QF \ldots \quad (5)$$

Figure 5:
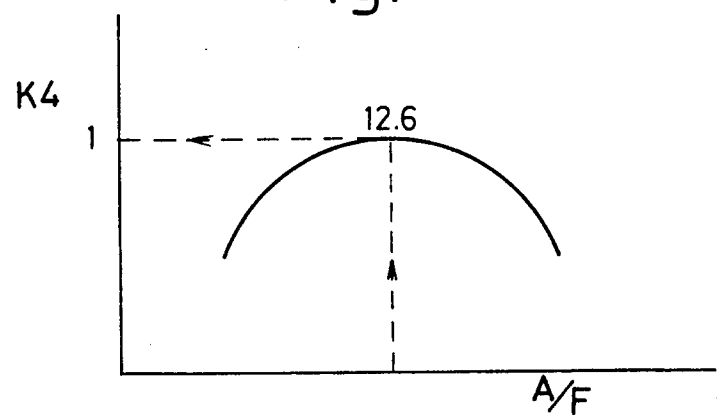
FIG. 5 is a characteristic diagram showing correction coefficients and air-fuel ratios.

Step 12 calculates a final output torque T (kg.m) according to the following equation:

$$T = K4 \times T' \times K5 \ldots \quad (6)$$

where the K4 is a correction coefficient based on the air-fuel ratio and obtainable from a table of air fuel ratios and changes (rates) in torque as shown in FIG. 5.

Figure 6:
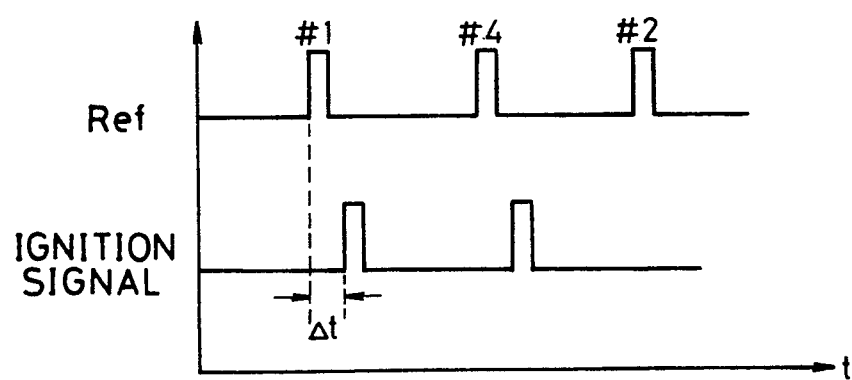
FIG. 6 is a view showing a calculation of ignition timing.

The K5 of equation (6) is a correction coefficient based on an ignition timing. As shown in FIG. 6, the ignition timing is detected on the basis of an interval $\Delta t$ between the reference signal from the crank angle sensor 8 and the ignition signal and according to the ignition timing detected (i.e., $\Delta t$) and the intake air quantity per revolution Q/N, the correction coefficient K5 is set. The K5 reaches the maximum value in the optimum ignition timing (MBT).

Thereafter, an output horsepower P (PS) is calculated according to the final output torque T found in Step 13 and the engine rotation speed N at this moment by using the following equation:

$$P = [2\pi N/(60 \times 75)] \times T \ldots \quad (7)$$

Steps 12 and 13 correspond to an engine output calculation means, in which Step 13 corresponds to an output horsepower calculation portion.

Step 14 successively displays the calculated output torque T and output horsepower P on the indicator 13 disposed on the front surface of the measurement unit 12.

A driver in the vehicle can always observe, while driving the vehicle, the output torque T and output horsepower P of the engine 1. This is very useful for the driver when determining a speed changing timing, etc.

The feature of the invention will be considered. According to the embodiment, the base torque is corrected with the correction coefficient K4 that is determined by a change in torque due to a change in the air-fuel ratio. Accordingly, even if the air-fuel ratio fluctuates due to a fluctuation in the fuel flow quantity, the base torque is properly corrected in response to the change, so that the output torque can be precisely measured for the entire engine operation range. The air-fuel ratio particularly fluctuates in a high-speed high-load region of the engine operation range because of the fluctuation of the fuel flow quantity, and the invention remarkably improves the accuracy of the output detection in this region. Even if the engine is unsound under the same operating conditions thereby causing a fluctuation in the fuel flow quantity and a change in the embodiment provides the same effect. For example, the invention is effective for a turbo car whose air-fuel ratio fluctuates drastically when an accelerator is fully applied.

According to the embodiment, the correction coefficient K5 properly corrects the base torque in response to a change in an ignition timing, so that the embodiment can accurately measure the output torque. In this embodiment, the base output is corrected according to the air-fuel ratio and ignition timing. It is possible to correct the base output in accordance with at least, the air-fuel ratio. This also improves the accuracy of the engine output measurement.

The correction coefficients K4 and K5 for all kinds of vehicles may be stored in a ROM, and necessary information may be read out of the ROM when a driver turns ON a dip switch.

As explained above, the invention considers, in measuring the output of an engine, a change in an air-fuel ratio caused by a fluctuation in a fuel flow quantity, to thereby accurately measure the engine output for an entire engine operation range. The invention improves the detection accuracy particularly in a high-speed heavy-load region of the engine operation range. Even if the engine operates poorly causing the air-fuel ratio to fluctuate because of the fluctuation of the fuel flow quantity under the same driving condition, the invention can accurately measure the engine output. The invention also considers a change in an ignition timing in calculating the engine output, thereby further improving the accuracy of the engine output measurement.

I claim:

1. A method of displaying an output of an internal combustion engine, comprising the steps of:
   detecting an intake air flow quantity of the engine;
   detecting a rotation speed of the engine;
   calculating an intake air quantity per revolution according to the intake air flow quantity and rotation speed, and finding a base output;
   detecting a fuel flow quantity supplied to the engine;
   calculating an air-fuel ratio according to the intake air flow quantity and fuel flow quantity;
   correcting the base output with the air-fuel ratio, and calculating an engine output; and
   displaying the engine output.

2. An apparatus for displaying an output of an internal combustion engine, comprising:
   an intake air flow quantity detection means for detecting an intake air flow quantity of the engine;
   an engine speed detection means for detecting a rotation speed of the engine;
   a base output calculation means for calculating an intake air quantity per revolution according to the intake air flow quantity and rotation speed, and finding a base output;
   a fuel flow quantity detection means for detecting a fuel flow quantity supplied to the engine;
   an air-fuel ratio calculation means for calculating an air-fuel ratio according to the intake air flow quantity and fuel flow quantity;
   an engine output calculation means for correcting the base output with the air-fuel ratio, and calculating an engine output; and
   a display means for displaying the engine output.

3. An apparatus as set forth in claim 2, wherein the base output calculation means finds a base torque by multiplying the intake air quantity per revolution by a predetermined constant.

4. An apparatus as set forth in claim 3, wherein the base output calculation means includes a base torque correction portion which corrects the base torque by subtracting a loss component based on the engine rotation speed from the base torque.

5. An apparatus as set forth in claim 4, wherein the engine output calculation means calculates an output torque of the engine by multiplying the base torque calculated by the base output calculation means by a correction coefficient determined according to the air-fuel ratio.

6. An apparatus as set forth in claim 5, wherein the engine output calculation means includes an output horsepower calculation portion for calculating an output horsepower of the engine according to the output torque and rotation speed of the engine.

7. An apparatus as set forth in claim 3, wherein the engine output calculation means calculates an output torque of the engine by multiplying the base torque calculated by the base output calculation means by a correction coefficient determined according to the air-fuel ratio.

8. An apparatus as set forth in claim 7, wherein the engine output calculation means includes an output horsepower calculation portion for calculating ah output horsepower of the engine according to the output torque and rotation speed of the engine.

9. An apparatus for displaying an output of an internal combustion engine, comprising:
   an intake air flow quantity detection means for detecting an intake air flow quantity of the engine;
   an engine speed detection means for detecting a rotation speed of the engine;
   a base output calculation means for calculating an intake air quantity per revolution according to the intake air flow quantity and rotation speed, and finding a base output;
   a fuel flow quantity detection means for detecting a fuel flow quantity supplied to the engine;
   an air-fuel ratio calculation means for calculating an air-fuel ratio according to the intake air flow quantity and fuel flow quantity;
   an ignition timing detection means for detecting an ignition timing of the engine;
   an engine output calculation means for correcting the base output with the air-fuel ratio and ignition timing, and calculating an engine output; and
   a display means for displaying the engine output.

* * * * *